(12) United States Patent
Sonnekalb

(10) Patent No.: US 12,038,808 B2
(45) Date of Patent: Jul. 16, 2024

(54) MEMORY INTEGRITY CHECK

(71) Applicant: Infineon Technologies AG, Neubiberg (DE)

(72) Inventor: Steffen Sonnekalb, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/305,497

(22) Filed: Apr. 24, 2023

(65) Prior Publication Data

US 2023/0359523 A1    Nov. 9, 2023

(30) Foreign Application Priority Data

May 5, 2022  (DE) .......................... 102022111126.1

(51) Int. Cl.
*G06F 11/10* (2006.01)
(52) U.S. Cl.
CPC ...... *G06F 11/1068* (2013.01); *G06F 11/1004* (2013.01)
(58) Field of Classification Search
None
See application file for complete search history.

(56) References Cited

U.S. PATENT DOCUMENTS

| | | | | |
|---|---|---|---|---|
| 7,814,396 B2 * | 10/2010 | Janke | ............... | G06K 19/07372 714/766 |
| 9,612,979 B2 * | 4/2017 | Chew | ................. | G06F 12/1441 |
| 11,327,836 B1 * | 5/2022 | Wu | ....................... | G06F 11/1068 |
| 2005/0060602 A1 * | 3/2005 | Battaia | ................ | G06F 11/1008 714/E11.034 |
| 2014/0181615 A1 * | 6/2014 | Kwok | ............... | H03M 13/2906 714/755 |
| 2020/0371872 A1 * | 11/2020 | Fuller | .................... | G11C 29/52 |
| 2023/0051590 A1 * | 2/2023 | Tkacik | ................ | G06F 11/1076 |

FOREIGN PATENT DOCUMENTS

| | | |
|---|---|---|
| DE | 102018123761 A1 | 4/2019 |
| EP | 3065078 A1 | 9/2016 |
| JP | H02205955 A | 8/1990 |

OTHER PUBLICATIONS

C. Borchert, H. Schirmeier and O. Spinczyk, "Generic Soft-Error Detection and Correction for Concurrent Data Structures," in IEEE Transactions on Dependable and Secure Computing, vol. 14, No. 1, pp. 22-36, Jan. 1-Feb. 2017 (Year: 2017).*
Feb. 17, 2023 (DE) Office Action—App. 102022111126.1.
Apr. 14, 2023 (DE) Office Action—App. 102022111126.1.

* cited by examiner

*Primary Examiner* — Daniel F. McMahon
(74) *Attorney, Agent, or Firm* — Banner & Witcoff Ltd.

(57) ABSTRACT

A data processing device including a memory having a plurality of memory locations for respectively storing a value, wherein the data processing device has, for each memory location, an associated error detection memory area, a memory controller which is configured, when a value is written to a memory location, to store an associated error detection code in the error detection memory area associated with the memory location, a memory access element, and an integrity checker configured to perform an EDC check.

12 Claims, 4 Drawing Sheets

MEMORY INTEGRITY CHECK

TECHNICAL FIELD

Exemplary embodiments relate generally to data processing devices and methods for checking the integrity of a memory.

BACKGROUND

Electronic devices must be protected against attacks in a variety of applications. Typical examples are security ICs, hardware roots of trust (e.g. trusted platform modules), smart cards that process and store secret data (e.g. keys or passwords) or data that should be protected against manipulation (e.g. credit on a credit card), or control devices, for example in a vehicle, whose correct function is important for the safety of a user. A possible point of attack for an electronic device is its memory, by manipulating which an attacker can learn secret data or impair the correct functioning of the electronic device. Therefore, mechanisms that effectively protect electronic memories against attacks (and also against spontaneous errors that do not result from an attack) are desirable.

SUMMARY

According to one embodiment, there is provided a data processing device comprising a memory having a plurality of memory locations each for storing a value, wherein the data processing device has for each memory location an associated error detection memory area (i.e. for each memory location an error detection memory area that is associated with the memory location), a memory control device which is configured to store an associated error detection code in the error detection memory area associated with the memory location when a value is written to the memory location, a memory access element, and an integrity checking device. The integrity checking device is configured to store a reference value for a check function over values stored in the memory locations, representing the values stored in the memory locations, and after storing the reference value, to generate a check value for the check function by reading out the memory locations, and, starting from an initial value, updating the check value for each memory location read out with the value read from the memory location so that the check value represents the value, and, after generating the check value, comparing the reference value and the check value and outputting a first signal depending on a result of the comparison. The integrity checking device is further configured to check, during a write access to a memory location, the error detection code stored before the write access in the error detection area belonging to the memory location to be written, and to output a second signal depending on the check.

According to a further embodiment, there is provided a method for checking the integrity of a memory according to the data processing device described above.

BRIEF DESCRIPTION OF THE DRAWINGS

The figures do not reflect the actual proportions but are intended to illustrate the principles of the various exemplary embodiments. Various exemplary embodiments are described in detail below with reference to the following figures.

DETAILED DESCRIPTION

The following detailed description relates to the appended figures, which show details and exemplary embodiments. These exemplary embodiments are described in detail so that a person skilled in the art can execute the disclosed subject mater. Other embodiments are also possible and the exemplary embodiments can be changed in structural, logic and electrical terms without departing from the disclosed subject matter. The different exemplary embodiments are not necessarily mutually exclusive; rather, different embodiments can be combined with each other, resulting in new embodiments.

Figure 1:
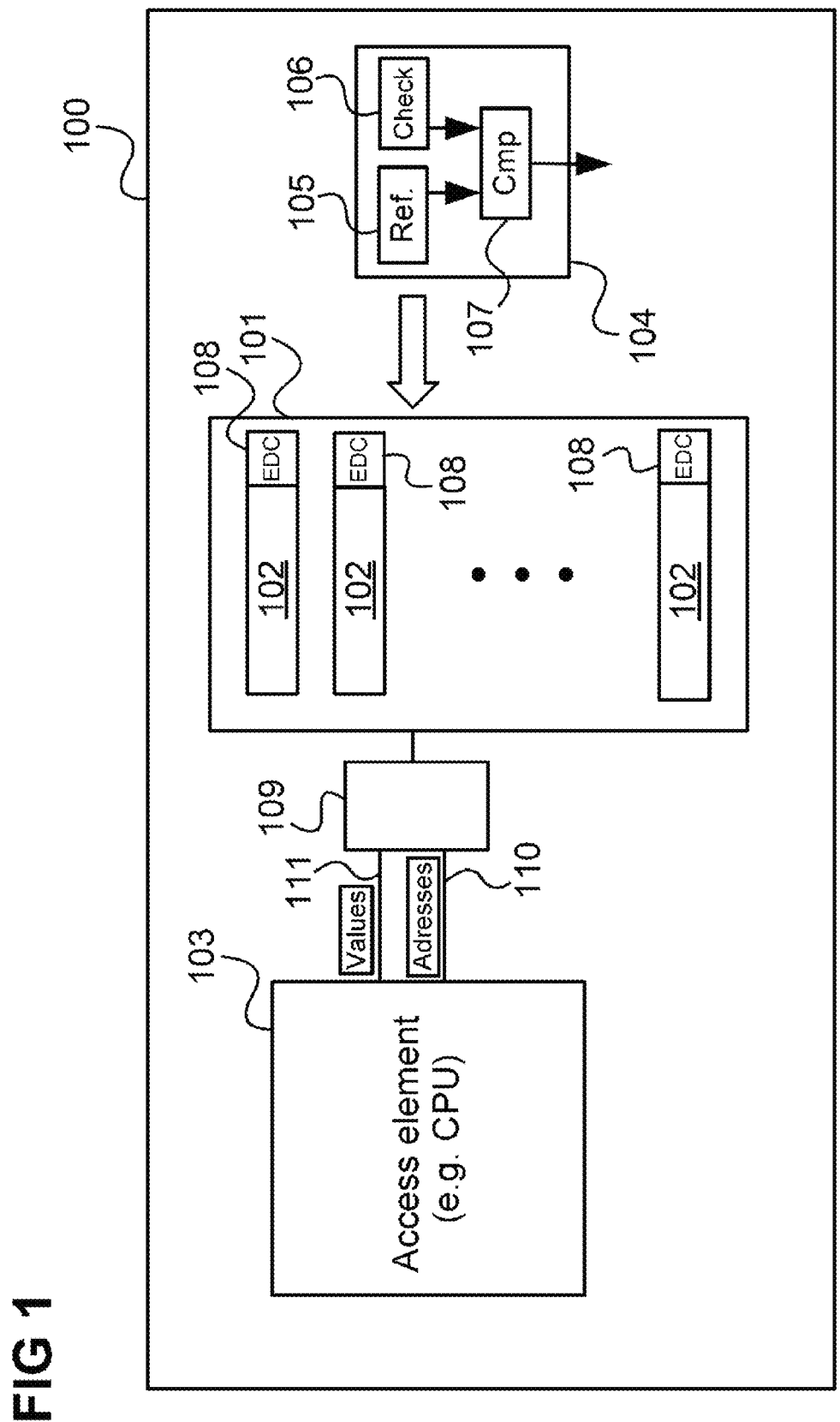
FIG. 1 shows a data processing device according to one exemplary embodiment.

FIG. 1 shows a data processing device 100.

The data processing device 100 may be any type of data processing device, such as for example a computer or smartphone, a smart card (of any form factor) or a control device (e.g. with a microcontroller) used in a vehicle, for example.

The data processing device 100 has a memory 101 containing memory locations 102. Each memory location is identified by an associated address (memory address, logical address, etc.) and each memory location 102 is formed by a group of memory cells, e.g. SRAM (Static Random Access Memory) cells or memory cells of another memory type, and allows the storage of a value (with a range of values depending on the number of bits that can be stored by means of the group of memory cells).

A memory access element 103 accesses the memory 101, i.e. reads and/or writes data from and/or to the memory 101. To do this, it provides an address to a memory control device (i.e., a memory controller) 109, which is provided for the memory 101, via an address line 110. For a write access, it also supplies a value to be written via a data line or receives a read value via a data line 111. The memory access element 103 may, for example, correspond to a processor (e.g. a CPU) of the data processing device 100 (or also to an application executed on the processor or a process executed on the processor), which reads from the memory 101 both data to be processed or program code to be executed, and writes results of the processing or execution to the memory 101.

However, the memory access element 103 may also be another element such as a cache controller, for example. For example, if the memory 101 is a cache memory, there may be a further memory for which the memory 101 is intended to be a cache memory, and a cache controller writes to the memory 101 for intermediately storing ("caching") values from the further memory.

Values stored in the memory 101 are subject to attacks or even spontaneous errors (glitches) and can thus be changed. In security-critical and safety-critical applications such as many smart cards and control devices for vehicles, it is particularly important to detect such changes and thus in particular attacks.

In order to prevent attacks on the memory 101, the memory integrity can thus be checked as a countermeasure in order to detect changes in the memory content caused, for example, by current peaks and disturbances, light or laser radiation, electromagnetic pulses, radiation, thermal changes or other effects.

This kind of memory integrity check as a countermeasure against attacks can be performed, for example, using:

EDC (error detection code): For each memory location, a memory area 108 (referred to as an error detection memory area) is also provided, which respectively stores an error detection code (i.e. a type of checksum) for the respective memory location 102. Examples of this are a parity check (simplest case with low error detection capability) and CRC (Cyclic Redundancy Check). The error detection code is generated by the memory control device 109 by applying an encoding function to the value which is to be stored in the respective memory location, and the error detection code is stored in the error detection memory area 108. According to various embodiments, the error detection code is generated by applying an encoding function to both the value to be stored and the address of the memory location. This means that the error detection code can be used to check not only whether a value that has been read out is itself error-free, but also whether it comes from the intended address.

Digital signature: The content of the memory is cryptographically hashed and each check value thus determined is compared with a respective expected value. However, a new check value must then be calculated for new contents and the contents of all memory cells to be protected must always be hashed. This leads to a loss of performance.

PFD (Post Failure Detection): The memory's intended use (e.g. a CPU access) is suspended, and an integrity checking device (implementing a state machine) performs a sequential checksum calculation by accessing the memory contents of the memory.

In order to use a PFD, an integrity checking device 104 is provided for accessing the memory 101. The integrity checking device 104 may be implemented in hardware, or in software running on a processor. The processor implementing the integrity checking device 104 may also be the same processor implementing the memory access element 103. For example, a processor executes two processes, one corresponding to the memory access element 103 (e.g. an application) and one implementing the integrity checking device 104.

The integrity device 104 has a first memory area 105 for a reference value and a second memory area 106 for a (current) check value of the checksum (generally for a check function). The memory areas 105, 106 are, for example, registers or memory areas in a working memory of the data processing device 100, depending on the implementation of the integrity checking device 104. Furthermore, the integrity checking device 104 comprises a comparator 107 (which may be a hardware circuit or a programmed function, depending on the implementation of the integrity device).

The integrity checking device 104 calculates checksums over the contents of the memory locations 102 at various times. If at a first time it has completed the calculation of a checksum over the contents of the memory locations 102 (i.e. over the values stored therein), it stores this sum as a reference value in the first memory area (reference memory area) 105.

It can then wait for a second time or start calculating a checksum again as a check value over the contents of the memory locations 102. Since the integrity checking device 104 reads the memory locations 102 for this purpose (and thus any changes to the memory locations are included in the check value) and this reading does not occur simultaneously for all memory locations 102, the integrity checking device 104 generates the check value over a certain period of time, wherein the second memory area (check value memory area) 106 always stores the current status of this check value. The integrity checking device 104, by starting from an initial value (typically zero) thus updates the check value for each memory location read out (e.g. by XOR-combining the previous value with the value read out) and stores the result in the second memory area 106, which accordingly can also be seen as an accumulator.

Once it has finished calculating the check value (i.e. it has read out all the memory locations and updated the check value with the values read out from them, so that the check value in this sense represents, i.e. contains, all the values read out), it compares the check value with the reference value. If the two do not match, it interprets this as an error (possibly caused by an attack) and issues an alarm signal or error signal to which other components of the data processing device 100 can respond appropriately, e.g. by stopping processing, resetting, warning a user, etc.

If the check value matches the reference value, the integrity checking device 104 sets the reference value to the check value and calculates a new check value (after a waiting time, if necessary).

It may be provided that write accesses of the access element 103 to the memory are blocked while the integrity checking device 104 calculates the check value. However, a mechanism may also be provided to allow the access element 103 to access the memory before the integrity checking device 104 has finished generating the check value.

In any case, however, there may typically be write accesses between the generation of the reference value and the comparison with the check value. In the event of such an intentional change (write access), the integrity checking device 104 adjusts the reference value accordingly so that it does not identify the intentional change as an error.

Figure 2:
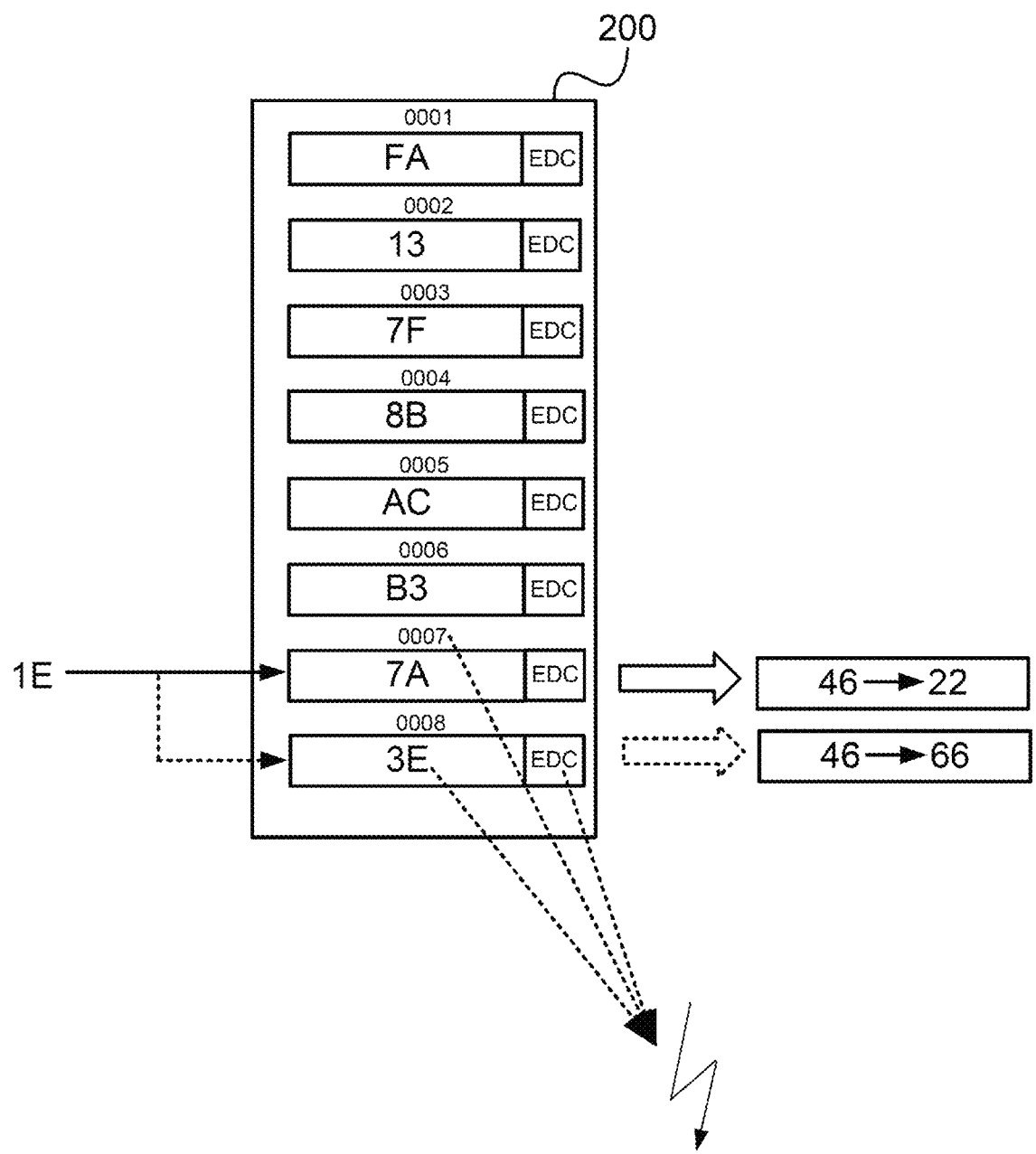
FIG. 2 shows an example of write access to a memory.

FIG. 2 shows an example of a write access.

For simplicity, the memory 101 has only eight memory locations. In practice, the memory 101 can have many more memory locations. However, a total memory comprising a plurality of such memories 101 (e.g. each having an integrity checking device 104) may also be provided to enable more frequent checking to take place (as fewer memory locations need to be read out before checking, i.e. comparison, can take place).

In this example, each memory location 102 stores a 32-bit value, represented in hexadecimal format.

The integrity checking device 104 is assumed to have calculated a reference value over the values at a previous time, for example by XOR-combining the stored values, so that the reference value is also a 32-bit value, in this case the value 46 (written in hexadecimal).

Next, a write access by the memory access element takes place. The seventh memory location is to be overwritten, in this example the value 7A by the value 1E.

Since this affects the reference value, the integrity checking device 104 adjusts the reference value accordingly by replacing 7A with 1E:

$$\text{Reference\_value\_new} = \text{Reference\_value\_old} + 7A + 1E = 46 + 7A + 1E = 22$$

wherein the XOR combination is written as '+'. To do this, it reads the old value 7A before writing the new value 1E into the memory location.

The integrity checking device 104 can also check whether the write access affects the current check value and can adjust this as well if necessary.

This allows the integrity checking device 104 to correctly calculate the reference value and the check value even when write accesses to the memory 101 are performed.

Unwanted changes in a value stored in the memory that occur between the generation of the reference value and the comparison of the check value with the reference value can however be detected.

However, a change cannot be corrected in a case where an attacker manages to manipulate which memory location is written to.

In the example of FIG. 2, the intended write access is a writing of 1E to the seventh memory location, which for simplicity has the address 0007. If an attacker succeeds in manipulating the memory control device 109 so that this value is written to the eighth memory location (address 0008) instead, and also succeeds in manipulating this so that the integrity checking device 104 gets the value 3E from the eighth memory location during the read access it performs to adjust the reference value, this attack cannot be detected by the integrity checking device 104.

It would adjust the reference value according to

Reference_value_new=Reference_value_old+3$E$+1$E$=46+3$E$+1$E$=66 and would not recognize this as an error, since it corresponds to the checksum over the contents of the memory after access.

According to various embodiments, a mechanism is provided whereby such an attack can be detected. It is based on a combination of EDC and integrity checking by means of error correction. This is explained below using the example of FIG. 2.

As explained above, the integrity checking device 104 performs a read access to adjust the reference value. If this read access is made to the actually intended memory location (i.e. address 0007), it receives the value 7A and adjusts the reference value by Reference_value_new=Reference_value_old+7$A$+1$E$=46+7$A$+1$E$=22.

However, this reference value no longer corresponds to the content of the memory 101 if, due to the attack, not 7A but 3E was replaced by 1E. The attack would thereby be detected.

It is assumed, then, as above, that the attacker succeeds in manipulating the memory control device 109 in such a way that the integrity checking device 104 gets the value 3E from the eighth memory location during the read access it performs to adjust the reference value. As explained above, it then adjusts the reference value to match the contents of the memory 101 and would not detect the attack.

In order to detect the attack nevertheless, the integrity checking device 104 reads not only the value but also the associated EDC by means of the read access and checks the EDC it receives together with the value during the read access. It does this by calculating the EDC for this value itself, using the address it wants to read. Since it wants to read from address 0007 (wherein it is assumed that it is informed that the write access is actually to be performed on address 0007, e.g. it is connected to address line 110) it does so in accordance with EDC_expected=$F$_encoding(3$E$,0007)

because it intends to access the address 0007 but receives the value 3E during the read access by the attack.

However, when the memory control device 109 stored the value 3E in the eighth memory location, it calculated the EDC as follows:

EDC_actual_value=$F$_encoding(3$E$,0008)

Accordingly, the integrity checking device 104 receives the EDC F_encoding(3E, 0008) but calculates the EDC itself using F_encoding(3E, 0007). Since it can recognize this difference by comparison, it can thereby detect the attack.

Figure 3:
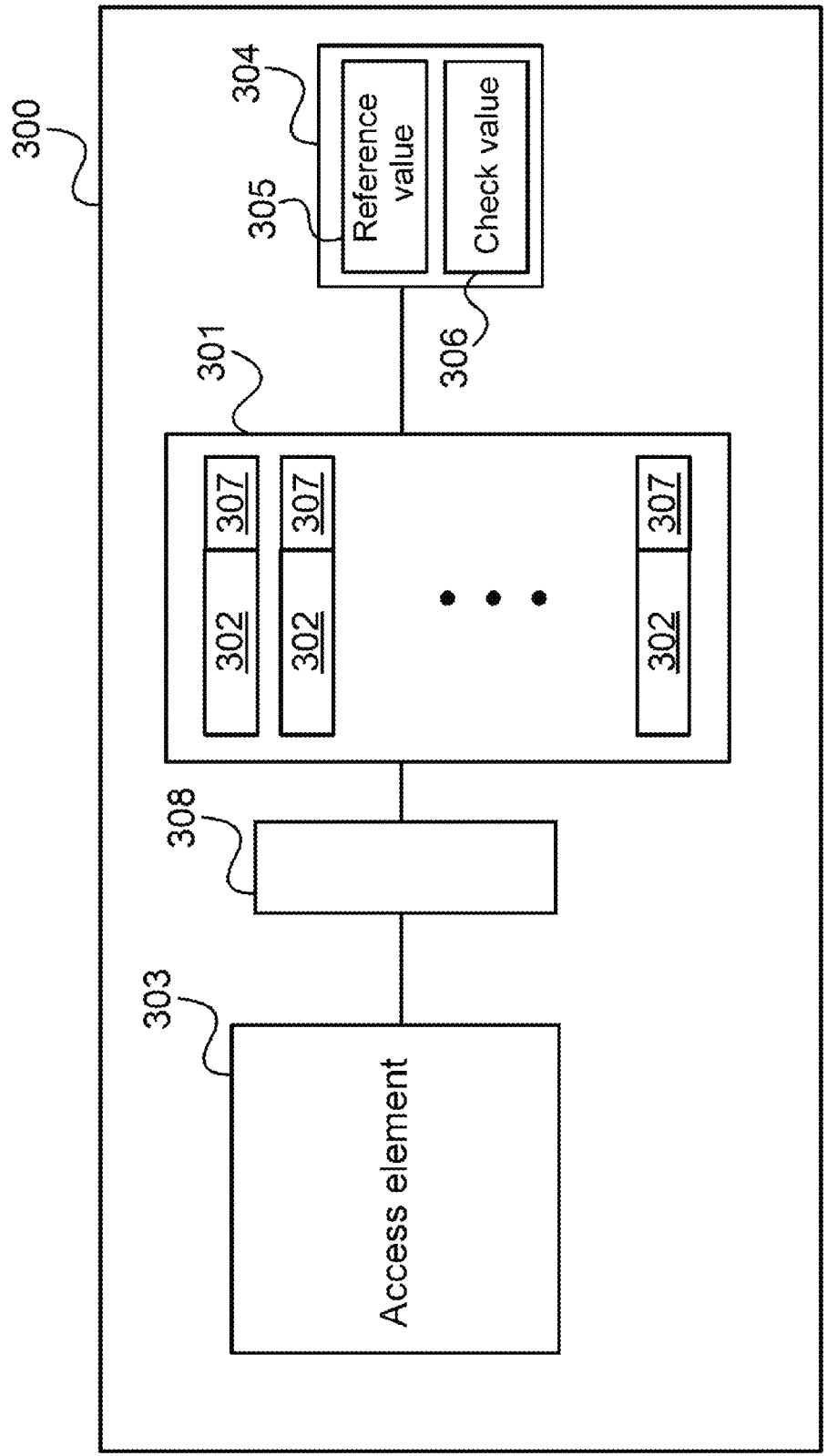
FIG. 3 shows a data processing device according to one exemplary embodiment.

In summary, according to various embodiments, a data processing device as shown in FIG. 3 is provided.

FIG. 3 shows a data processing device 300 according to one exemplary embodiment.

The data processing device 300 comprises a memory 301 having a plurality of memory locations 302 for storing one value at a time, wherein each memory location 302 is identified by an address. The data processing device 300 has an associated error detection memory area 307 for each memory location (i.e., an associated error detection memory area for each memory location).

The data processing device 300 further comprises a memory control device 308 which is configured to store an associated error detection code when a value is written to a memory location 303 in the error detection memory area 307 of the memory location (i.e., the error detection memory area associated with the memory location).

The data processing device 300 further comprises a memory access element 303 and an integrity checking device 304 which is configured to store a reference value for a check function over values stored in the memory locations 302, the reference value representing the values stored in the memory locations 302, and after storing the reference value, to generate a check value for the check function by reading the memory locations 302 and, starting from an initial value, updating the check value for each memory location 302 read out with the value read from the memory location so that the check value represents the value and, after generating the check value, comparing the reference value and the check value and outputting a first signal (alarm signal or error signal, EDC error signal) depending on a result of the comparison.

The integrity checking device 304 is configured to check, during a write access to a memory location, the error detection code which before the write access is stored in the error detection area belonging to the memory location to be written, and to output a second signal (alarm signal or error signal) depending on the check.

In other words, according to various embodiments, a memory integrity check by means of a value of a check function over the memory contents (i.e., for example, in the sense of a PFD) is combined with a check based on an EDC that depends in particular on the address of a respective memory location. Through this combination, attacks that cannot be detected by the individual measures (EDC and memory integrity check by means of a check function) can be detected.

The first signal and the second signal need not differ in terms of their content. They can be considered as different error signals or alarm signals because they are triggered by different check operations.

The check function is, for example, a checksum such as an XOR operation of the stored values or, more generally, a commutative operation of a mapping of the contents of the memory locations to be checked is generated, i.e. if the values are $W_0, W_1, \ldots W_n$, then the check value is equal to $f_0(W0)+f_1(W1)+ \ldots +f_n(W_n)$ with mappings (e.g. weightings) $f_0 \ldots f_n$.

For example, the integrity checking device is configured, in the event of a write access to a memory location of the memory identified by a specified address, to cause the memory access element to perform a read access to the memory location identified by the specified address and the associated error detection code, and to adjust the reference value such that this reference value represents the value to be written by the memory access instead of the value read out by the read access, to determine an error detection code by applying the encoding function to the value read out by the read access and the specified address and to check whether the determined error detection code matches the error detection code read out by the read access and, if the determined error detection code does not match the error detection code read out by the read access, to output a second signal (i.e., a signal that is set to a value indicating a corresponding error). The second signal indicates, for example, that the read access was not performed on the correct memory location.

Figure 4:
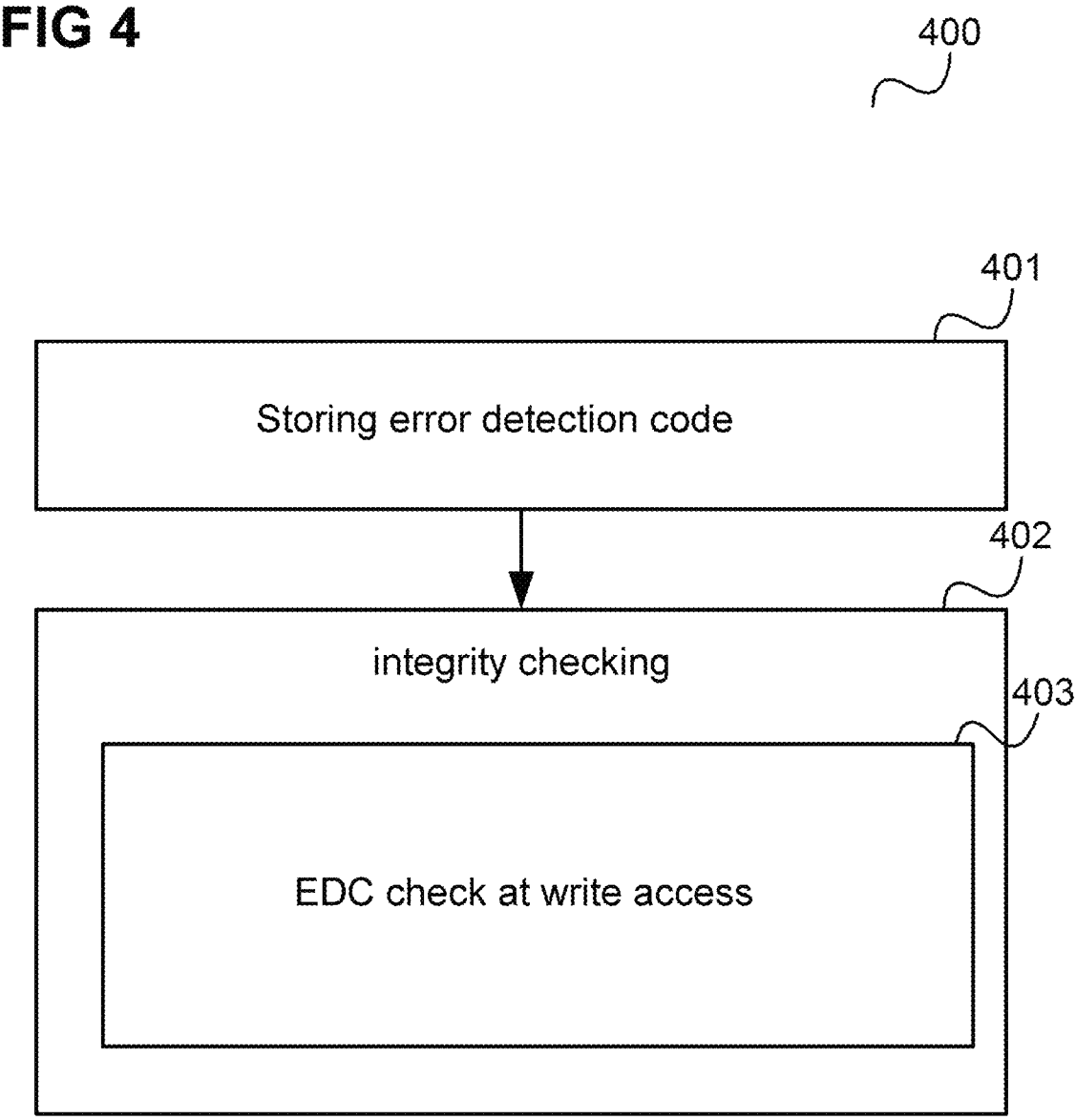
FIG. 4 shows a flowchart illustrating a method for checking the integrity of a memory according to one exemplary embodiment.

According to various embodiments, a method is executed as shown in FIG. 4.

FIG. 4 shows a flowchart 400 illustrating a method for checking the integrity of a memory.

In 401, when a value is written to a memory having a plurality of memory locations for storing one value at a time, wherein each memory location has a respective error detection memory area associated therewith, an associated error detection code is stored in the error detection memory area associated with the memory location.

In 402, a reference value is stored for a check function over values stored in the memory locations, the reference value representing the values stored in the memory locations, and after storing the reference value, a check value for the check function is generated by reading the memory locations and, starting from an initial value, updating the check value for each memory location read with the value read from the memory location, so that the check value represents the value, and, after generating the check value, comparing the reference value and the check value and, depending on a result of the comparison, outputting a first signal.

In 403, in the event of a write access to a memory location, the error detection code, stored in the error detection area associated with the memory location to be written to before the write access, is checked, and a second signal is output depending on the check.

According to one embodiment, a data processing device is provided, the data processing device having memory means for storing, when writing a value in a memory having a plurality of memory locations for storing a respective value, wherein the data processing device has for each memory location an associated error detection memory area, an associated error detection code in the error detection memory area associated with the memory location; and integrity checking means for storing a reference value for a check function over values stored in the memory locations, the reference value representing the values stored in the memory locations, and after storing the reference value, generating a check value for the check function by reading the memory locations, and, starting from an initial value, updating the check value for each memory location read with the value read from the memory location so that the check value represents the value, and comparing, after generating the check value, the reference value and the check value and outputting, depending on a result of the comparison, a first signal; wherein the integrity checking means, upon a write access to a memory location, check the error detection code stored in the error detection area associated with the memory location to be written to prior to the write access, and output a second signal depending on the check.

Various exemplary embodiments are stated below.

Exemplary embodiment 1 is a data processing device as described with reference to FIG. 3.

Exemplary embodiment 2 is a data processing device according to exemplary embodiment 1, wherein the integrity device is configured to repeatedly perform the generation of the check value and the comparison of the reference value with the check value.

Exemplary embodiment 3 is a data processing device according to exemplary embodiment 2, wherein the integrity device is configured to perform the generation of the check value and the comparison of the reference value with the check value continuously or periodically.

Exemplary embodiment 4 is a data processing device according to any of the exemplary embodiments 1 to 3, wherein the error detection code depends on the value stored in the memory location.

Exemplary embodiment 5 is a data processing device according to any of the exemplary embodiments 1 to 4, wherein each memory location is identified by an address and the error detection code is obtained by applying an encoding function at least to the address identifying the memory location.

Exemplary embodiment 6 is a data processing device according to any of the exemplary embodiments 1 to 5, wherein the integrity checking device is configured to check the error detection code which is stored in the error detection memory area associated with the memory location upon a read access to the memory location, and to output a third signal depending on the check.

Exemplary embodiment 7 is a data processing device according to any of the exemplary embodiments 1 to 6, wherein the first signal indicates that one of the stored values has changed without write access by the memory access element, or has not changed despite write access by the memory access element to change it.

Exemplary embodiment 8 is a data processing device according to any of the exemplary embodiments 1 to 7, wherein the check function is a commutative operation of a mapping of the stored values.

Exemplary embodiment 9 is a data processing device according to any of the exemplary embodiments 1 to 8, wherein the memory access element is a data processing unit that accesses the memory, wherein the memory is a non-volatile memory, a random access memory, or one or more registers.

Exemplary embodiment 10 is a data processing device according to any of the exemplary embodiments 1 to 9, wherein the integrity checking device is configured to output the first signal when the reference value does not match the check value.

Exemplary embodiment 11 is a data processing device according to any of the exemplary embodiments 1 to 10, wherein the error detection code results from applying the encoding function to at least the value and address which identifies the memory location.

Exemplary embodiment 12 is a method for checking the integrity of a memory as described above with reference to FIG. 4.

The method of FIG. 4 may be performed by one or more computers (or, more generally, data processing devices or semiconductor chip devices) having one or more data processing units. The term "data processing unit" can be understood as any type of entity that enables the processing of data or signals. For example, the data or signals may be handled according to at least one (i.e. one or more than one) specific function performed by the data processing unit. A data processing unit may be an analog circuit, a digital circuit, a logic circuit, a microprocessor, a microcontroller, a central processing unit (CPU), a graphics processing unit (GPU), a digital signal processor (DSP), a crypto-processor, a cache controller, a DMA controller, an integrated circuit of a programmable gate array (FPGA), or any combination thereof. Any other means of implementing the respective functions described in more detail herein may also be understood as a data processing unit or logic circuitry. One or more of the process steps described in detail herein may be performed (e.g. implemented) by a data processing unit through one or more specific functions performed by the data processing unit. One or more such data processing units may implement one or more data processing devices.

Although the disclosed subject matter has been shown and described primarily with reference to specific embodiments, it should be understood by those familiar with the technical field that numerous modifications can be made with regard to configuration and details thereof, without departing from the essence and scope of the invention as defined by the claims hereinafter. The scope of the invention is therefore determined by the appended claims, and the intention is for all modifications to be encompassed which come under the literal meaning or the scope of equivalence of the claims.

LIST OF REFERENCE SIGNS

100 Data processing device
101 Memory
102 Memory locations
103 Access element
104 Integrity checking device
105, 106 Memory areas for checksums
107 Comparator
108 Error detection memory area
109 Memory control device
110 Address line
111 Data line
200 Memory
300 Data processing device
301 Memory
302 Memory locations
303 Access element
304 Integrity checking device
305 Reference value
306 Check value
307 Error detection code
308 Memory control device
400 Flowchart
401-403 Processing

The invention claimed is:

1. A data processing device, comprising:
a memory having a plurality of memory locations each for storing a value;
an associated error detection memory area for each memory location;
a memory controller which is configured to store an associated error detection code in the error detection memory area associated with the memory location when a value is written to the memory location;
a memory access element; and
an integrity checker which is configured to store a reference value for a check function over values stored in the memory locations, representing the values stored in the memory locations, and after storing the reference value, to generate a check value for the check function by reading out the memory locations, and, starting from an initial value, updating the check value for each memory location read out with the value read from the memory location so that the check value represents the value, and, after generating the check value, comparing the reference value and the check value and outputting a first signal depending on a result of the comparison,
wherein the integrity checker is configured to check, during a write access to a memory location, the error detection code stored before the write access in the error detection memory area belonging to the memory location to be written, and to output a second signal depending on the check.

2. The data processing device as claimed in claim 1, wherein the integrity checker is configured to repeatedly perform the generation of the check value and the comparison of the reference value with the check value.

3. The data processing device as claimed in claim 2, wherein the integrity checker is configured to perform the generation of the check value and the comparison of the reference value with the check value continuously or periodically.

4. The data processing device as claimed in claim 1, wherein the error detection code depends on the value stored in the memory location.

5. The data processing device as claimed in claim 1, wherein each memory location is identified by an address and the error detection code is obtained by applying an encoding function to at least the address identifying the memory location.

6. The data processing device as claimed claim 1, wherein the integrity checker is configured to check the error detection code which is stored in the error detection memory area associated with the memory location upon a read access to a memory location, and to output a third signal depending on the check.

7. The data processing device as claimed in claim 1, wherein the first signal indicates that one of the stored values has changed without write access by the memory access element or has not changed despite write access by the memory access element to change it.

8. The data processing device as claimed in claim 1, wherein the check function is a commutative operation of a mapping of the stored values.

9. The data processing device as claimed in claim 1, wherein the memory access element is a data processor that accesses the memory, wherein the memory is a non-volatile memory, a random access memory, or one or more registers.

10. The data processing device as claimed in claim 1, wherein the integrity checker is configured to output the first signal when the reference value does not match the check value.

11. The data processing device as claimed in claim 5, wherein the error detection code results from applying the encoding function to at least the value and address which identifies the memory location.

12. A method for checking an integrity of a memory, comprising:

storing, when writing a value in a memory having a plurality of memory locations for storing a respective value, wherein each memory location has a respective error detection memory area associated therewith, an associated error detection code in the error detection memory area associated with the memory location; and storing a reference value for a check function over values stored in the memory locations which represent the values stored in the memory locations, and after storing the reference value, generating a check value for the check function by reading the memory locations and, starting from an initial value, updating the check value for each memory location read with the value read from the memory location, so that the check value represents the value, and comparing, after generating the check value, the reference value and the check value and outputting, depending on a result of the comparison, a first signal, wherein during a write access to a memory location, the error detection code which before the write access is stored in the error detection area belonging to the memory location to be written is checked, and a second signal is output depending on the check.

* * * * *